US012366339B1

(12) United States Patent
Shih

(10) Patent No.: US 12,366,339 B1
(45) Date of Patent: Jul. 22, 2025

(54) VEHICLE LIGHT DEVICE

(71) Applicant: T.Y.C. BROTHER INDUSTRIAL CO., LTD., Tainan (TW)

(72) Inventor: Ming-Chih Shih, Tainan (TW)

(73) Assignee: T.Y.C. BROTHER INDUSTRIAL CO., LTD., Tainan (TW)

(*) Notice: Subject to any disclaimer, the term of this patent is extended or adjusted under 35 U.S.C. 154(b) by 0 days.

(21) Appl. No.: 18/659,322

(22) Filed: May 9, 2024

(51) Int. Cl.

| | |
|---|---|
| ***F21S 41/265*** | (2018.01) |
| ***F21S 41/143*** | (2018.01) |
| ***F21S 41/148*** | (2018.01) |
| ***F21S 41/151*** | (2018.01) |
| ***F21S 41/32*** | (2018.01) |
| ***F21S 43/20*** | (2018.01) |
| ***F21S 43/31*** | (2018.01) |
| ***F21S 43/40*** | (2018.01) |

(52) U.S. Cl.

CPC ........... *F21S 41/265* (2018.01); *F21S 41/143* (2018.01); *F21S 41/148* (2018.01); *F21S 41/151* (2018.01); *F21S 41/322* (2018.01); *F21S 43/2643* (2024.05); *F21S 43/315* (2018.01); *F21S 43/402* (2024.05)

(58) Field of Classification Search

CPC ..... F21S 43/2643; F21S 41/143; F21S 41/148

See application file for complete search history.

(56) References Cited

U.S. PATENT DOCUMENTS

| | | | | |
|---|---|---|---|---|
| 11,815,240 | B1 * | 11/2023 | Shih | F21S 41/26 |
| 2014/0321141 | A1 * | 10/2014 | Bauer | F21S 41/321 362/235 |
| 2022/0136671 | A1 * | 5/2022 | Zhu | F21S 41/285 362/520 |
| 2024/0175560 | A1 * | 5/2024 | Darlage | F21S 41/28 |

* cited by examiner

*Primary Examiner* — Eric T Eide

(74) *Attorney, Agent, or Firm* — MUNCY, GEISSLER, OLDS & LOWE, P.C.

(57) ABSTRACT

A vehicle light device includes an optical lens and a light-emitting unit. The optical lens includes first light exit and entry lens portions, second light entry and exit lens portions connected respectively to upper and lower portions of the first light exit lens portion. The first and second light exit lens portions have respectively first and second light exit surfaces facing forwardly. The light-emitting unit includes first and second light emitting modules configured to emit first and second light rays, which travel toward the first and second light exit lens portions upon entering the first and second light entry lens portions, and which exit outwardly of the first and second light exit surfaces, respectively, toward the first and second light entry lens portions.

9 Claims, 9 Drawing Sheets

VEHICLE LIGHT DEVICE

FIELD

The disclosure relates to a light device, and more particularly to a vehicle light device.

BACKGROUND

Referring to FIG. 1, a conventional vehicle light device includes a first light emitting unit 111 capable of emitting light rays forwardly, and a first lens unit 112 disposed in front of the first light emitting unit 111. The light rays emitted from the first light emitting unit 111 project forwardly and outwardly from a front portion of the first lens unit 112 upon entering the first lens unit 112. In such conventional vehicle light device, a direction of light rays emitted from the first light emitting unit 111 and a projection direction of light rays projected outwardly from the first lens unit 112 are the same.

Referring to FIG. 2, another conventional vehicle light device includes two second light emitting units 121 vertically spaced apart, and a second lens unit 122 located between the second light emitting units 121. One of the second light emitting units 121 emits light rays upwardly and another one of the second light emitting units 121 emits light rays downwardly. The light rays emitted from each of the second light emitting units 121 project forwardly and outwardly from a front portion of the second lens unit 122 upon entering the second lens unit 122. That is to say, in the another conventional vehicle light device, a direction of light rays emitted from the second light emitting units 121 and a projection direction of light rays projected outwardly from the second lens unit 122 are perpendicular to each other.

SUMMARY

Therefore, an object of the disclosure is to provide a vehicle light device different from the prior art.

According to the disclosure, a vehicle light device includes an optical lens and a light-emitting unit. The optical lens includes a first light exit lens portion, a first light entry lens portion, a second light exit lens portion, and a second light entry lens portion. The first light exit lens portion has a first light exit surface that is disposed at a front portion thereof and that faces forwardly in a front-rear direction. The first light entry lens portion is connected to the first light exit lens portion and is disposed behind the first light exit lens portion in the front-rear direction. The second light entry lens portion is connected to one of an upper portion and a lower portion of the first light exit lens portion that are opposite in an up-down direction perpendicular to the front-rear direction. The second light exit lens portion is connected to another one of the upper portion and the lower portion of the first light exit lens portion, and has a second light exit surface and an inclined reflective surface. The second light exit surface is connected to the another one of the upper portion and the lower portion and faces forwardly in the front-rear direction. The inclined reflective surface extends inclinedly and rearwardly in the front-rear direction from one end of the second light exit surface opposite to the first light exit surface. The light-emitting unit includes a first light emitting module and a second light emitting module. The first light emitting module is configured to emit a plurality of first light rays toward the first light entry lens portion. The first light rays travel toward the first light exit lens portion upon entering the first light entry lens portion, and exit outwardly of the first light exit surface. The second light emitting module is configured to emit a plurality of second light rays toward the second light entry lens portion. Upon entering the second light entry lens portion, the second light rays pass by the first light exit lens portion, travel toward the second light exit lens portion, and then are reflected by the inclined reflective surface to exit outwardly of the second light exit surface.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
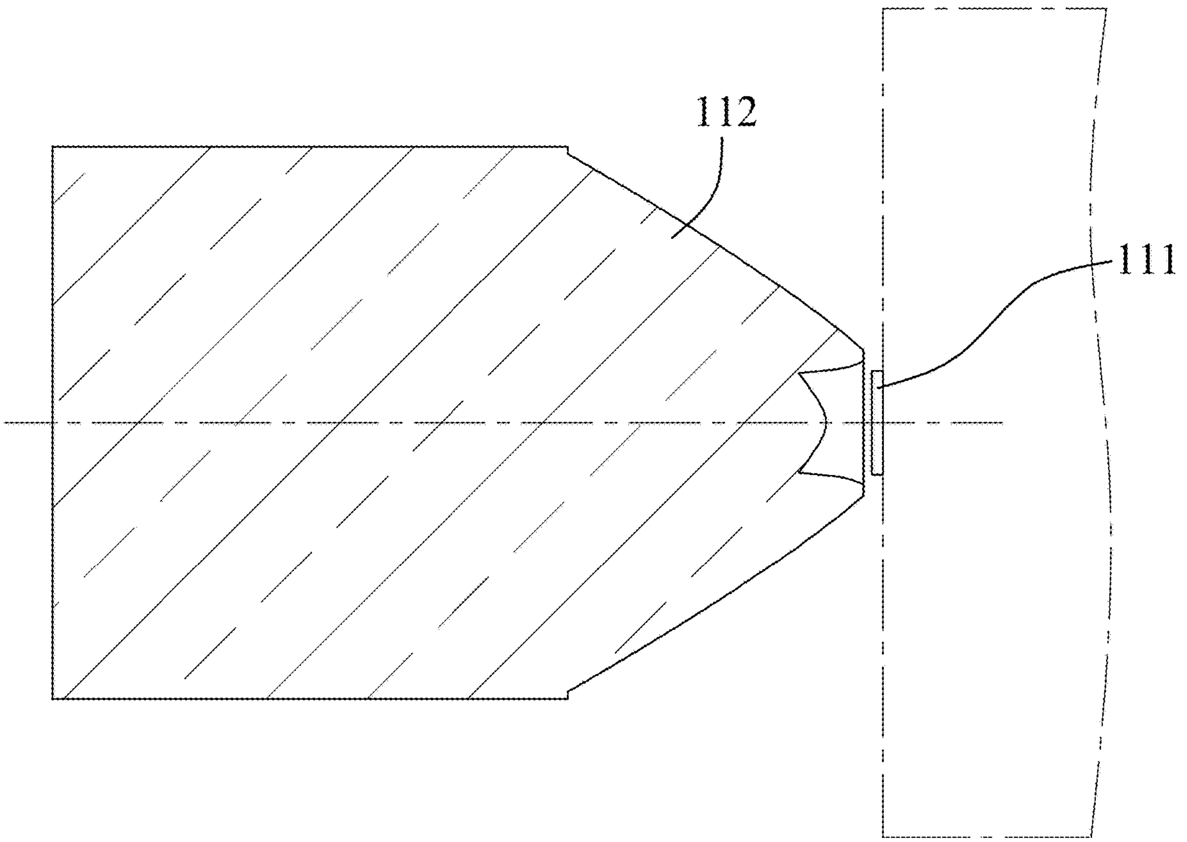
FIG. 1 PRIOR ART
FIG. 1 is a fragmentary sectional view of a conventional vehicle light device.
Figure 2:
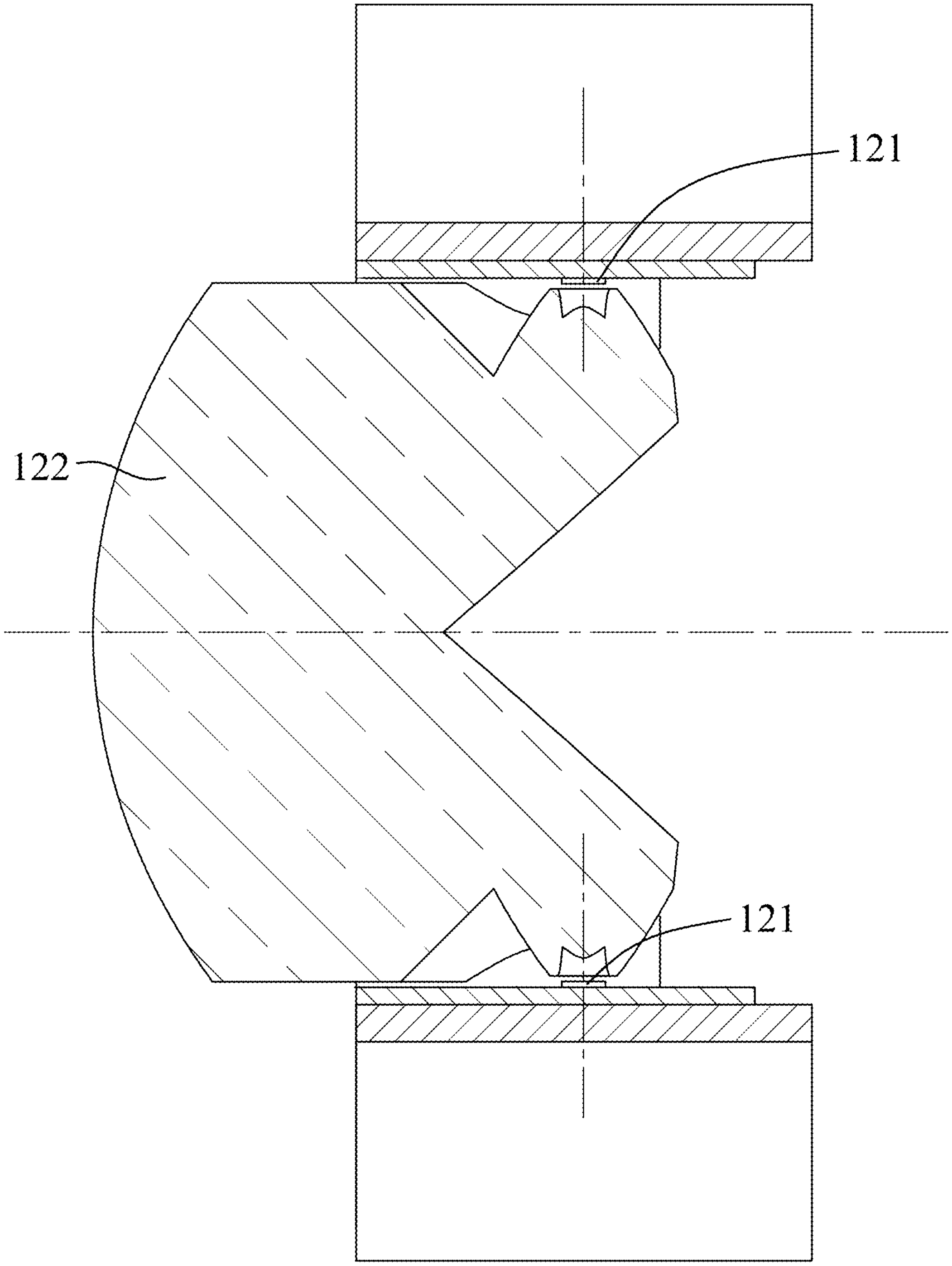
FIG. 2 PRIOR ART
FIG. 2 is a fragmentary sectional view of another conventional vehicle light device.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
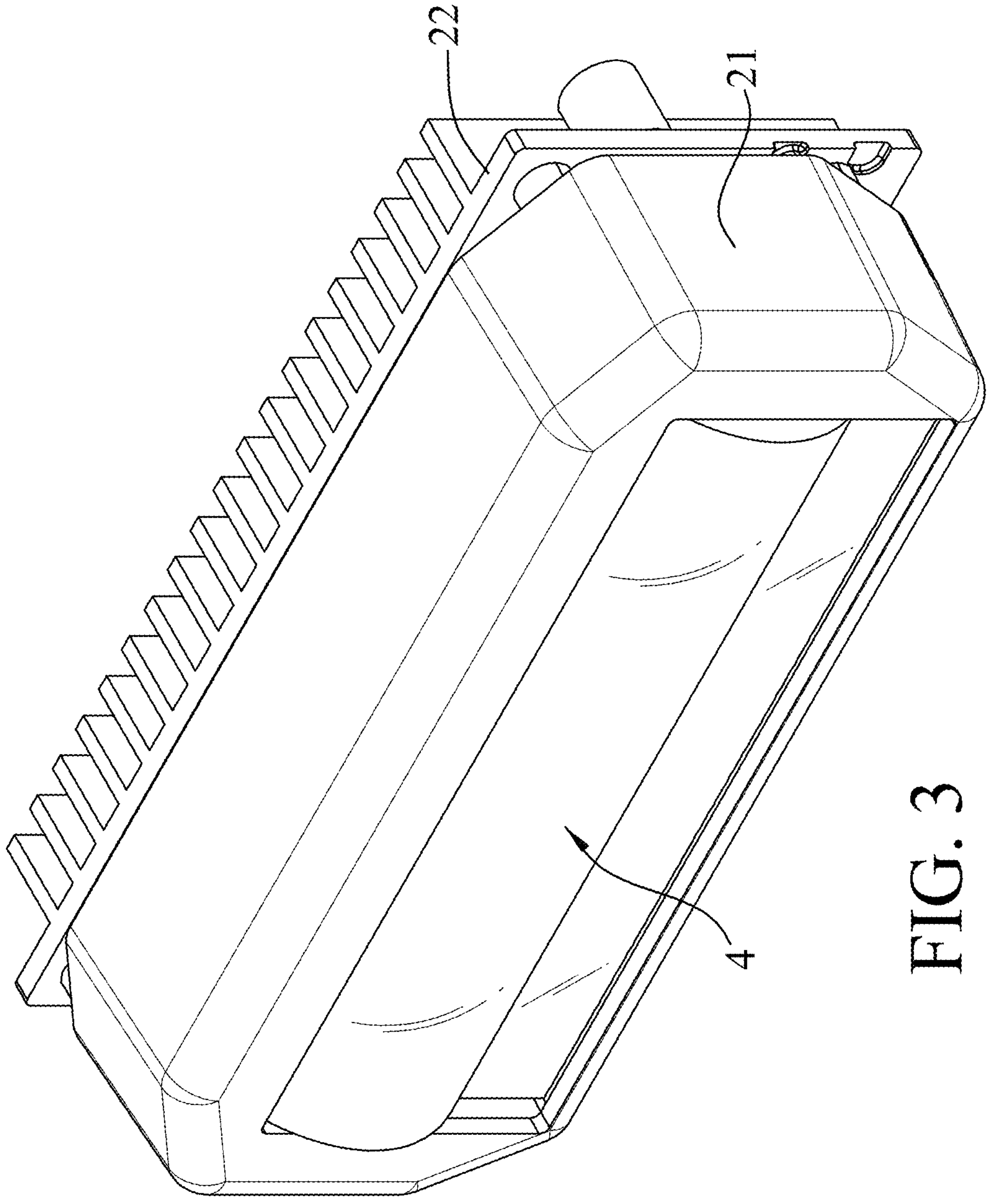
FIG. 3 is a perspective view of a vehicle light device of an embodiment according to the present disclosure.
Figure 4:
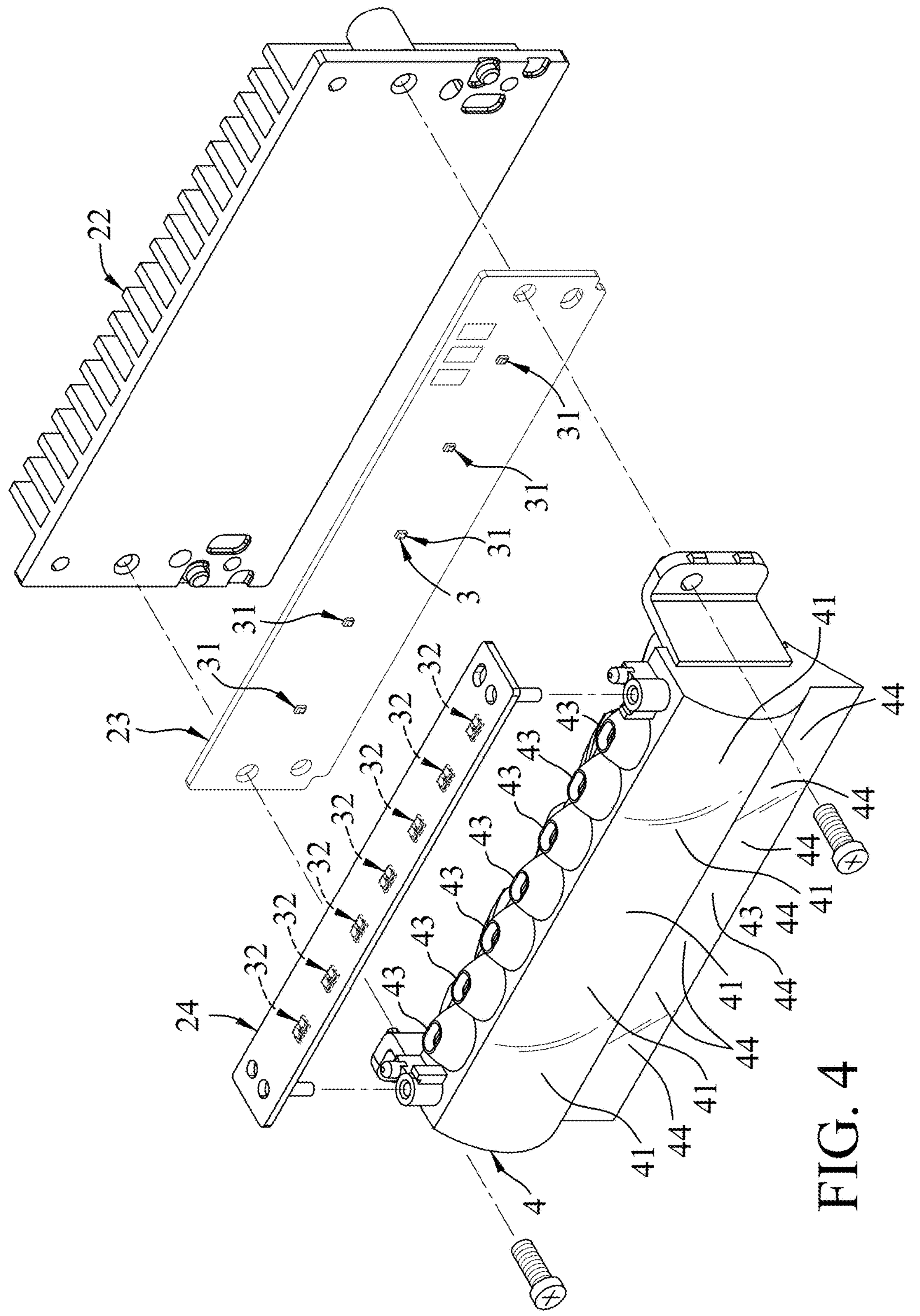
FIG. 4 is a partly exploded perspective view of the embodiment.
Figure 5:
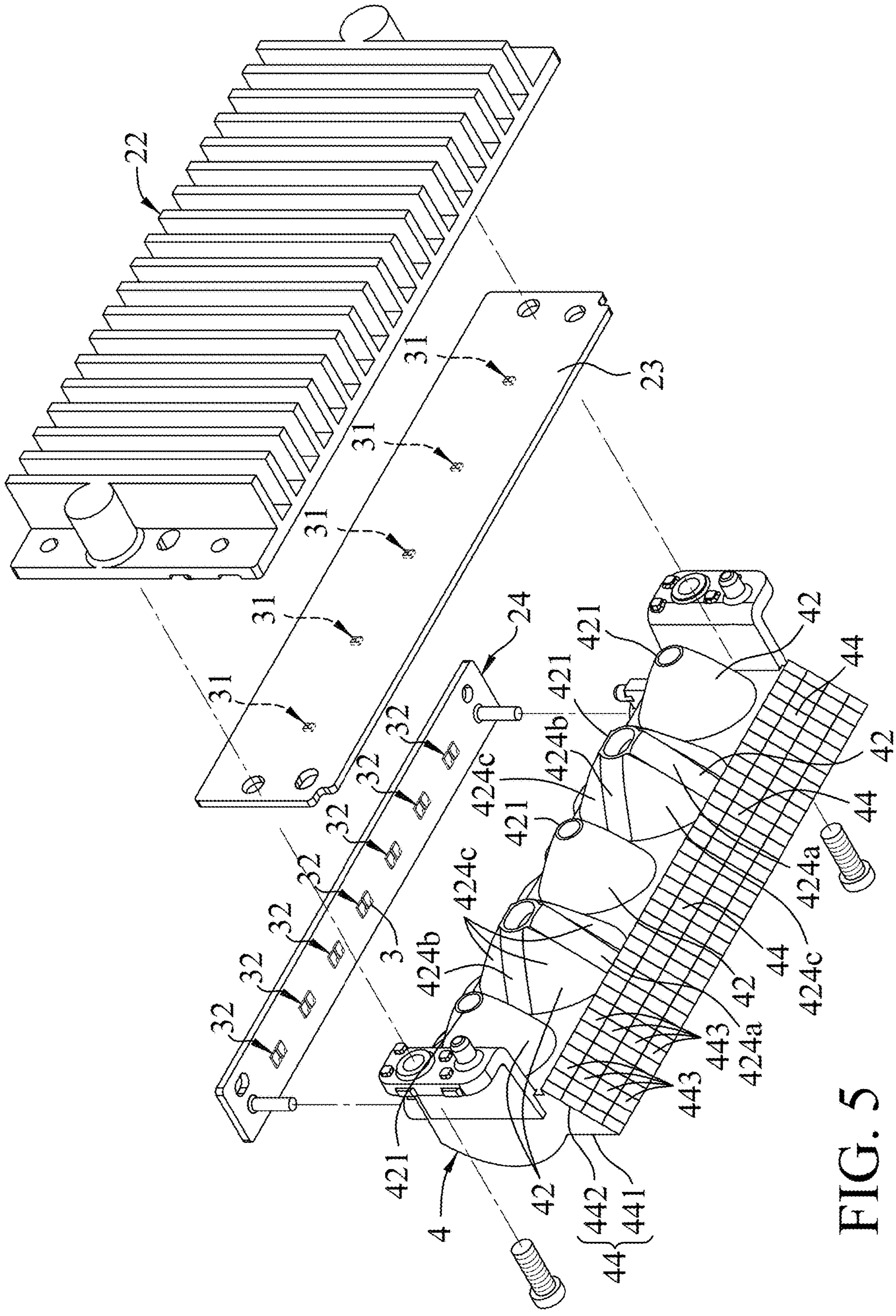
FIG. 5 is a partly exploded perspective view of the embodiment seen from another view of angle different from FIG. 4.

Referring to FIGS. 3, 4 and 5, a vehicle light device of an embodiment according to the present disclosure includes a vehicle lamp housing 21 (see FIG. 3), a heat dissipation seat 22 mounted to the vehicle lamp housing 21, a first circuit board 23 mounted to the heat dissipation seat 22, a second circuit board 24 having a normal line perpendicular to a normal line of the first circuit board 23, a light-emitting unit 3 mounted to the first circuit board 23 and the second circuit board 24, and an optical lens 4 mounted to the heat dissipation seat 22 and the first circuit board 23.

In this embodiment, the vehicle lamp housing 21 is substantially a rectangular frame. The heat dissipation seat 22 is a fin heat sink. The first circuit board 23 extends in an up-down direction and faces forwardly in a front-rear direction perpendicular to the up-down direction. The second circuit board 24 extends in the front-rear direction and is perpendicular to the first circuit board 23.

Figure 6:
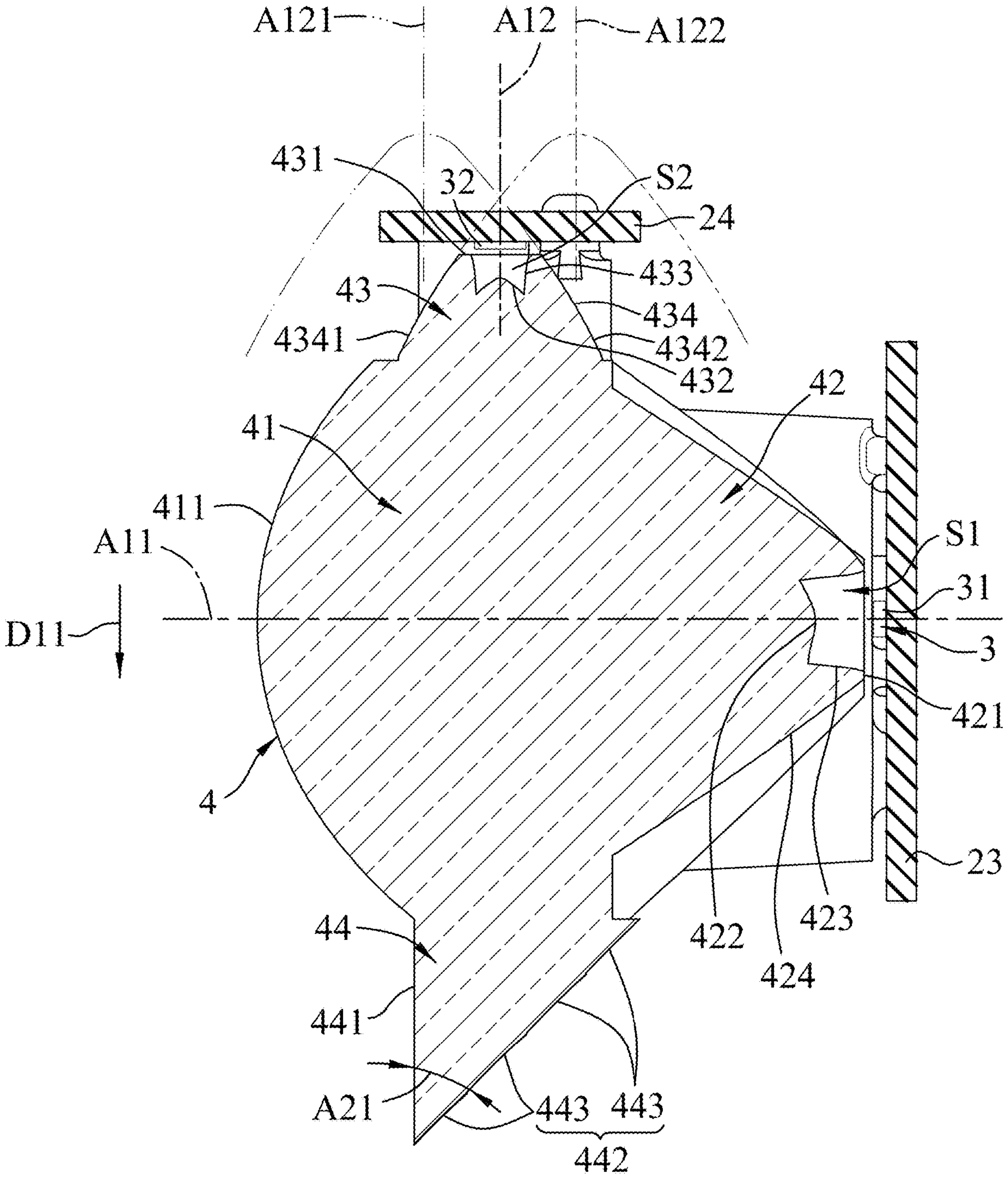
FIG. 6 is a sectional view of the embodiment.

Referring to FIGS. 4, 5 and 6, the light-emitting unit 3 includes a plurality of first light emitting modules 31 mounted to a front portion of the first circuit board 23, and a plurality of second light emitting modules 32 disposed on a bottom portion of the second circuit board 24. In this embodiment, a number of the first light emitting modules 31 is five and a number of the second light emitting modules 32 is seven. Since the first light emitting modules 31 have identical structures, and the second light emitting modules 32 have identical structures, only one of the first light emitting modules 31 and one of the second light emitting modules 32 will be described in the following description for the sake of brevity.

The first light emitting module 31 is configured to emit a plurality of first light rays (11) (see FIG. 8) forwardly toward the optical lens 4, and the second light emitting module 32 is configured to emit a plurality of second light rays (L12) (see FIG. 9) downwardly toward the optical lens 4. Specifically, the first light emitting module 31 and the second light emitting module 32 emit light rays by a plurality of light-emitting diode (LED) chips. The manner of how the first light rays (L11) and the second light rays (L12) produced respectively by the first light emitting module 31 and the second light emitting module 32 travel would be illustrated later, after structures of the optical lens 4 is described.

The optical lens 4 includes a plurality of first light exit lens portions 41 connected integrally with each other as one piece and arranged in a left-right direction perpendicular to the up-down direction and the front-rear direction, a plurality of first light entry lens portions 42 connected respectively and integrally to rear portions of the first light exit lens portions 41, a plurality of second light entry lens portions 43 connected to top portions of the first light exit lens portions 41, and a plurality of second light exit lens portions 44 connected to lower portions of the first light exit lens portions 41. A number of the first light exit lens portions 41 is the same as a number of the first light entry lens portions 42, and a number of the second light entry lens portions 43 is the same as a number of the second light exit lens portions 44. In this embodiment, the number of the first light entry lens portions 42 is five and the number of the second light entry lens portions 43 is seven.

Figure 7:
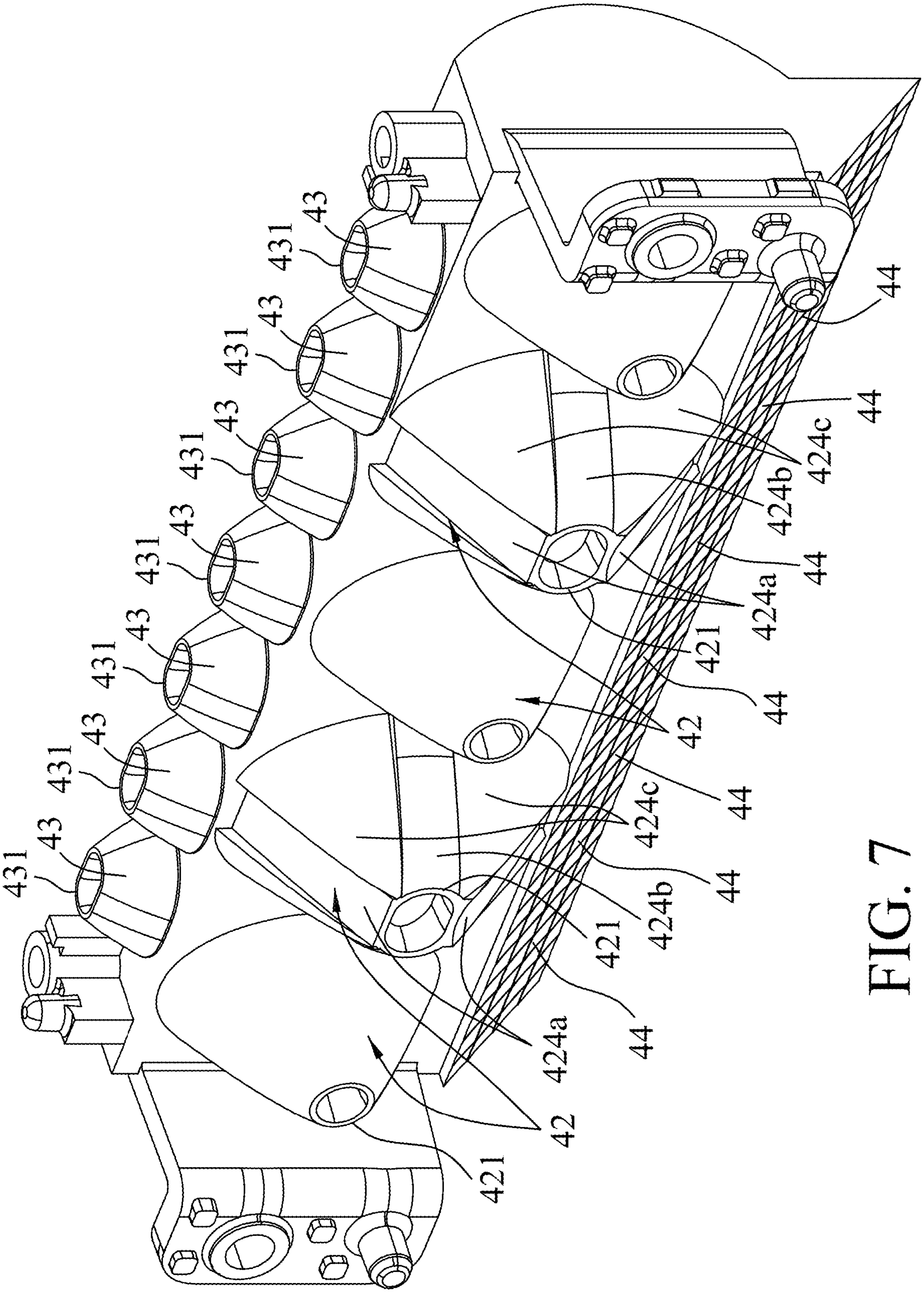
FIG. 7 is a perspective view of an optical lens of the embodiment.
Figure 8:
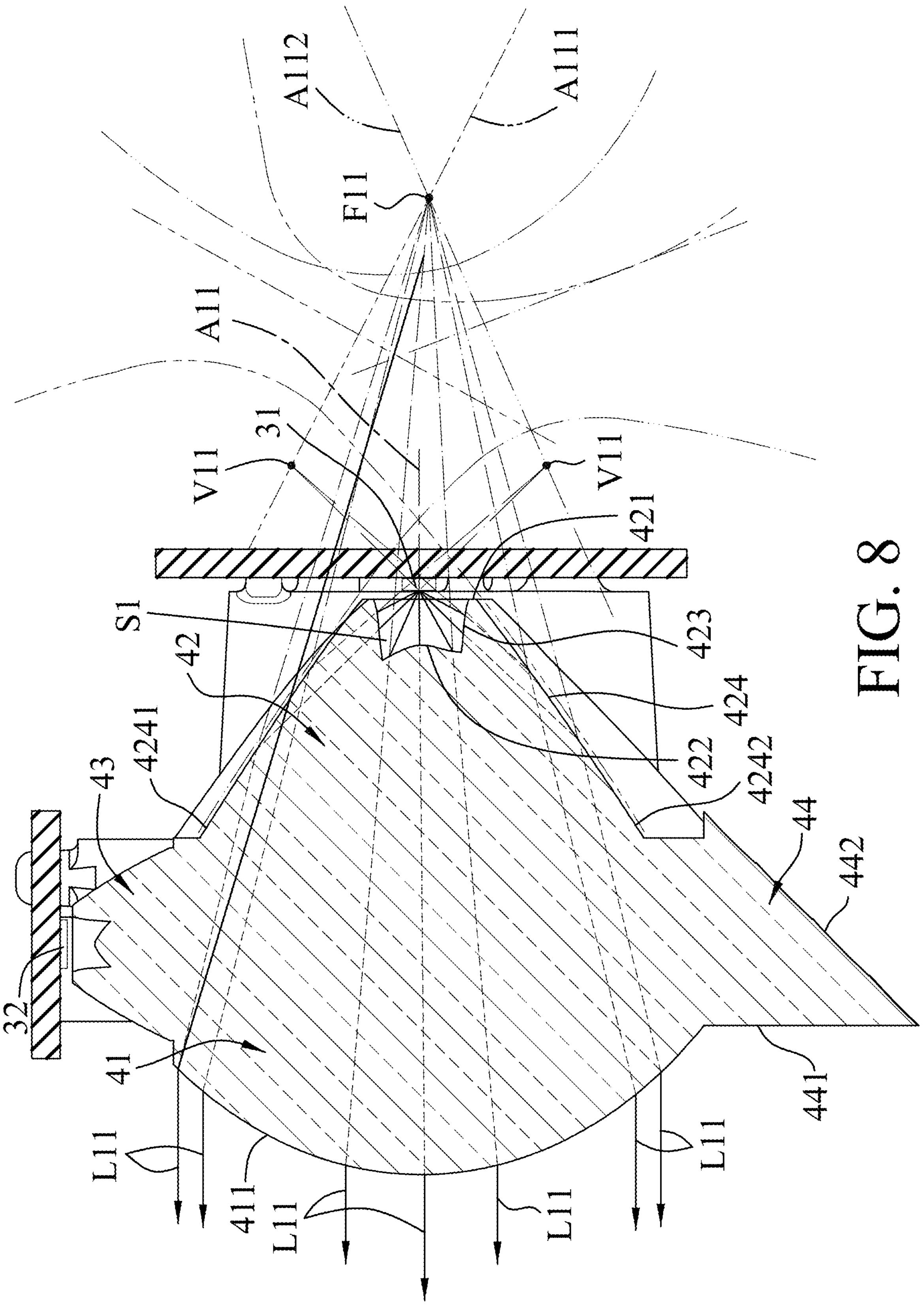
FIG. 8 is a sectional view similar to FIG. 6, but illustrating travel of a plurality of first light rays of the embodiment.

Since the first light exit lens portions 41 have identical structures, the first light entry lens portions 42 have identical structures, the second light entry lens portions 43 have identical structures, and the second light exit lens portions 44 have identical structures, only one of the first light exit lens portions 41, one of the first light entry lens portions 42, one of the second light entry lens portions 43, and one of the second light exit lens portions 44 will be described in the following description for the sake of brevity. It should be noted that, as shown in FIG. 7, a third one of the first light entry lens portions 42 is aligned with a fourth one of the second light entry lens portions 43 in the front-rear direction, and FIGS. 6 and 8 are sectional views cutting through the third one of the first light entry lens portions 42 and the fourth one of the second light entry lens portions 43.

The first light exit lens portion 41 has a first light exit surface 411 disposed at a front portion thereof and facing forwardly in the front-rear direction. The first light exit surface 411 protrudes forwardly and has a first focal point (F11) (see FIG. 8) located behind the first light emitting module 31.

A number of the first light entry lens portions 42 of the optical lens 4 is the same as a number of the first light emitting modules 31 of the light-emitting unit 3. In the following description, only one of the first light entry lens portions 42 and one of the first light emitting modules 31 will be described for the sake of brevity. Referring mainly to FIG. 6, the first light entry lens portion 42 is formed with, at a rear part thereof, a first light-collecting space (S1) extending substantially in the front-rear direction, and has a first end section 421 formed on the rear part thereof. The first light-collecting space (S1) allows the first light rays (11) (see FIG. 8) emitted from the first light emitting module 31 to pass therethrough and to enter the first light entry lens portion 42.

The first light entry lens portion 42 has the first end section 421 formed on the rear part thereof and being a rearmost end of the first light entry lens portion 42, a first main light incident surface 422 disposed in front of the first light-collecting space (S1), a first bordering light incident surface 423 connected to and bordering the first main light incident surface 422 and cooperating with the first main light incident surface 422 and the first end section 421 to define the first light-collecting space (S1) thereamong, and a first reflecting surface 424 extending forwardly from the first end section 421 in the front-rear direction, connected to the first light exit lens portion 41, and embracing the first light-collecting space (S1).

In this embodiment, a center portion of the first main light incident surface 422 protrudes rearwardly, the first bordering light incident surface 423 is substantially annular, and the first reflecting surface 424 diverges gradually and forwardly in the front-rear direction. Further referring to FIG. 8, the first reflecting surface 424 includes two first reflecting portions 4241, 4242 symmetric with respect to a first optical axis (A11) (see FIG. 6). As shown in FIG. 8, each of the first reflecting portions 4241, 4242 is a portion of a hyperboloid that is symmetric with respect to an axis extending through the first focal point (F11) and one of first imaginary focal points (V11). Specifically, a lower one of the first reflecting portions 4242 depicted in FIG. 8 is a portion of a hyperboloid that is symmetric with respect to an axis (A111) extending through the first focal point (F11) and an upper one of the first imaginary focal points (V11). An upper one of the first reflecting portions 4241 is a portion of another hyperboloid that is symmetric with respect to another axis (A112) extending through the first focal point (F11) and a lower one of the first imaginary focal points (V11). It should be noted that since FIG. 8 is a sectional view, only two of the first imaginary focal points (V11) are visible in the drawings.

Referring to FIGS. 5, 6 and 7, the first reflecting surface 424 includes two first sections 424*a* spaced apart from each other in the up-down direction and extending forwardly from the first end section 421 in the front-rear direction, two second sections 424*b* spaced apart from each other in the left-right direction and extending forwardly from the first end section 421 in the front-rear direction, and a plurality of third sections 424*c* extending forwardly from the first end section 421 in the front-rear direction. Each of the third sections 424*c* is disposed between an adjacent one of the first sections 424*a* and an adjacent one of the second sections 424*b* and is discontinuous with the adjacent one of the first sections 424*a* and the adjacent one of the second sections 424*b*. It should be noted that, in this embodiment, only two of the first light entry lens portions 42 have the abovementioned structures and are disposed alternatively with the remaining three of the first light entry lens portions 42.

Referring to FIGS. 4, 5, and 6, the number of the second light entry lens portions 43 of the optical lens 4 is the same as the number of the first light emitting modules 31 of the light-emitting unit 3. In the following description, only one of the second light entry lens portions 43 and one of the first light emitting modules 31 will be described for the sake of brevity. Referring mainly to FIG. 6, the second light entry lens portion 43 is formed, at an uppermost part thereof, with a second light-collecting space (S2) extending substantially in the up-down direction. The second light-collecting space (S2) allows the second light rays (L12) (see FIG. 9) to pass therethrough.

The second light entry lens portion 43 has a second end section 431 formed on the uppermost part thereof, a second main light incident surface 432 disposed under the second light-collecting space (S2) in the up-down direction, a second bordering light incident surface 433 connected to and bordering the second main light incident surface 432 and cooperating with the second main light incident surface 432 and the second end section 431 to define the second light-collecting space (S2) thereamong, and a second reflecting surface 434 extending downwardly from the second end section 431 in the up-down direction, connected to the first light exit lens portion 41, and embracing the second light-collecting space (S2). In this embodiment, the second main light incident surface 432 is disposed between the second light-collecting space (S2) and the first light exit lens portion 41 in the up-down direction.

Figure 9:
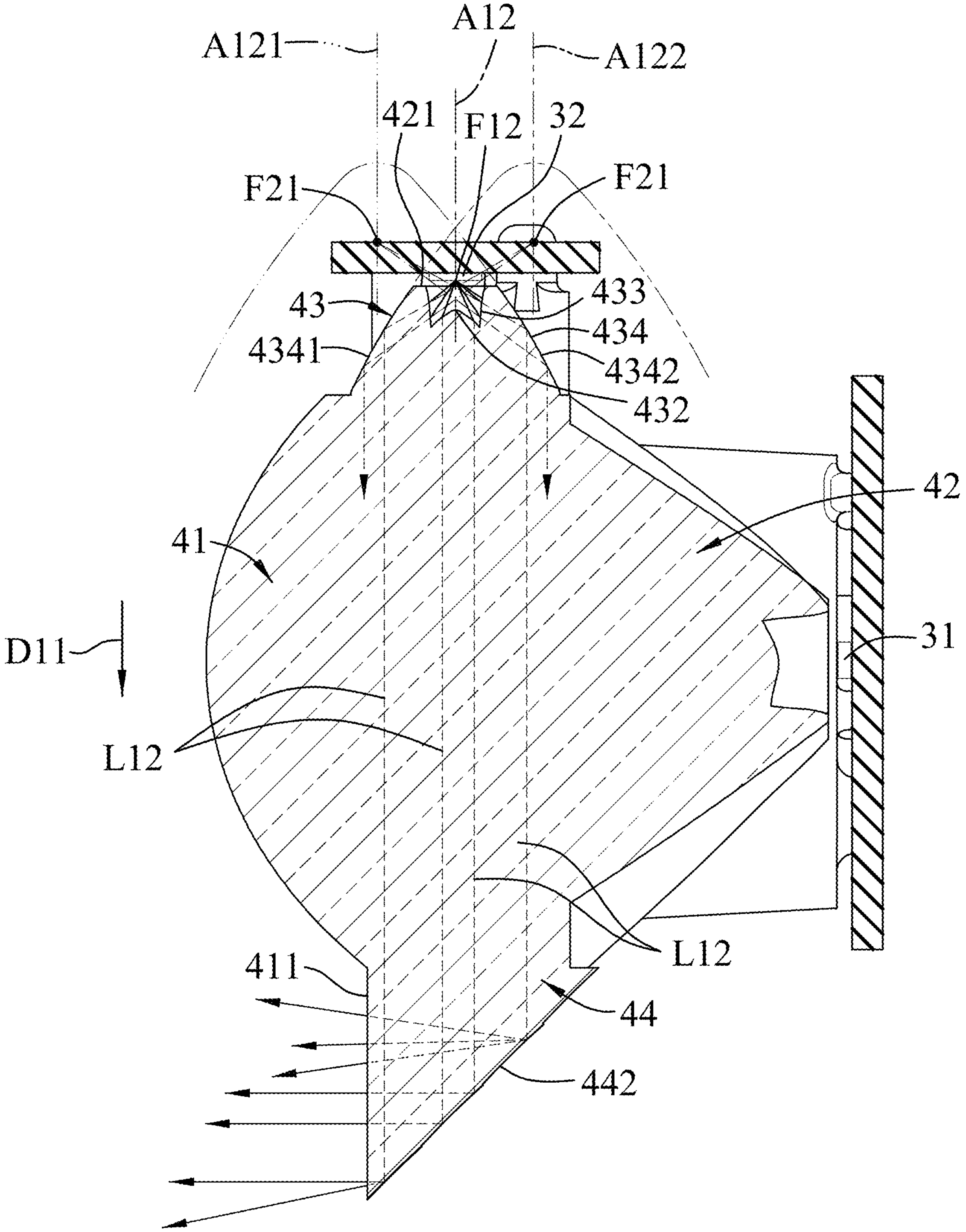
FIG. 9 is a sectional view similar to FIG. 6, but illustrating travel of a plurality of second light rays of the embodiment.

The second main light incident surface 432 has a center portion protruding upwardly in the up-down direction, and has a second focal point (F12) (see FIG. 9). In this embodiment, the second light emitting module 32 is disposed at the second focal point (F12). That is to say, the second light emitting module 32 overlaps the second focal point (F12).

Further referring to FIG. 9, the second reflecting surface 434 diverges gradually and downwardly, and includes two second reflecting portions 4341, 4342 symmetric with respect to a second optical axis (A12). Each of the second reflecting portions 4341, 4342 is a portion of a paraboloid that is symmetric with respect to an axis deviated from and parallel to the second optical axis (A12) and that has a focal point (F21). Specifically, as depicted in FIG. 9, a left one of the second reflecting portions 4341 is a portion of a paraboloid that has the left one of the focal points (F21), and that is symmetric with respect to an axis (A121) deviated from and parallel to the second optical axis (A12), and a right one of the reflecting portions 4342 is a portion of another paraboloid that has the right one of the focal points (F21), that is symmetric with respect to another axis (A122) deviated from and parallel to the second optical axis (A12).

The second light exit lens portion 44 has a second light exit surface 441 having a top end that is connected to the lower portion of the first light exit lens portion 41 and facing forwardly in the front-rear direction, and an inclined reflective surface 442 extending inclinedly and rearwardly in the front-rear direction from a lower end of the second light emit surface 441 that is opposite to the first light exit surface 411.

The second light exit surface 441 extends vertically from the first light exit surface 411 in the up-down direction, faces forwardly in the front-rear direction, and cooperates with the inclined reflective surface 442 to define an angle (A21) ranging from 40 degrees to 50 degrees therebetween. In this embodiment, the angle (A21) is 45 degrees. It should be noted that the angle (A21) may be an integer ranging from 40 to 50.

The inclined reflective surface 442 includes a plurality of reflective surface portions 443 (see FIG. 5). The reflective surface portions 443 are divided into a plurality of groups arranged in the left-right direction. The reflective surface portions 443 of each of the groups are arranged in the up-down direction. Each of the reflective surface portions 443 is a portion of a cylindrical surface of a cylinder, and since the radius of curvature of the cylindrical surface is quite large, a curved shape of each of the reflective surface portions 443 is not clearly shown in the drawings. It should be noted that an axial direction of each of the cylinders extends in a direction the same as the direction in which the inclined reflective surface 442 extends.

Referring to FIGS. 6, 8, and 9, a manner of how the first light rays (L11) and the second light rays (L12) travel will be described below. It should be noted that, in the drawings, the light rays propagating in the air are represented by solid lines, the light rays propagating in the optical lens 4 are represented by dashed lines, and extension lines of the light rays being reflected or refracted are represented by dash-dotted lines.

As shown in FIG. 8, the first light emitting module 31 is configured to emit the first light rays (L11) toward the first light entry lens portion 42. The first light rays (L11) travel toward the first light exit lens portion 41 upon entering the first light entry lens portion 42, and exit outwardly of the first light exit surface 411. Specifically, a portion of the first light rays (L11) that are emitted from the first light emitting module 31 propagate into the first light entry lens portion 42 through the first main light incident surface 422. Extension lines of the portion of the first light rays (L11) that are incident on the first main light incident surface 422 extending through the first focal point (F11) are deemed to be emitted from the first focal point (F11) of the first light exit surface 411 and propagate outwardly of the first light exit lens portion 41 via the first light exit surface 411 as parallel light rays.

Another portion of the first light rays (11) that are emitted from the first light emitting module 31 propagate into the first light entry lens portion 42 through the first bordering light incident surface 423. Extension lines of the another portion of the first light rays (11) incident on the first bordering light incident surface 423 extend through a plurality of first imaginary focal points (V11). Each of the first imaginary focal points (V11) and the first focal point (F11) are two focal points of a hyperbola. Since the reflecting property of a hyperbola is that extension lines of light rays that are emitted from one of the focal points of the hyperbola being reflected by a branch of the hyperbola that has the one of the focal points, i.e., a half of the hyperbola, extend through another one of the focal points of the hyperbola, the extension lines of the another portion of the first light rays (11) reflected by the first reflecting surface 424 extend through the first focal point (F11). That is to say, extension lines of the another portion of the first light rays (11) incident on the first bordering light incident surface 423 and reflected by the first reflecting surface 424 extend through the first focal point (F11) and are deemed to be emitted from the first focal point (F11) of the first light exit surface 411, and propagate outwardly of the first light exit lens portion 41 via the first light exit surface 411 as parallel light rays.

Referring to FIG. 9, the second light emitting module 32 is configured to emit a plurality of second light rays (L12) toward the second light entry lens portion 43. Upon entering the second light entry lens portion 43, the second light rays (L12) pass by the first light exit lens portion 41, travel toward the second light exit lens portion 44, and then are reflected by the inclined reflective surface 442 to exit outwardly of the second light exit surface 441. Specifically, a portion of the second light rays (L12) that are emitted from the second light emitting module 32 propagate into the second light entry lens portion 43 through the second main light incident surface 432. The portion of the second light rays (L12) incident on the second main light incident surface 432 travel toward the inclined reflective surface 442 in a projecting direction (D11) transverse to the front-rear direction. Since the second light emitting module 32 is disposed on the second focal point (F12) of the second main light incident surface 432, the portion of the second light rays (L12) incident on the second main light incident surface 432 propagate downwardly toward the inclined reflective surface 442 as parallel light rays. That is, in this embodiment, the projecting direction (D11) is the up-down direction that is perpendicular to the front-rear direction. Finally, the portion of the second light rays (L12) project outwardly and forwardly of the second light exit surface 441 upon reflected by the inclined reflective surface 442.

Another portion of the second light rays (L12) that are emitted from the second light emitting module 32 propagate into the second light entry lens portion 43 through the second bordering light incident surface 433. Extension lines of the another portion of the second light rays (L12) incident on the second bordering light incident surface 433 extend through the focal points (F21). That is to say, extension lines of the another portion of the second light rays (L12) incident on the second bordering light incident surface 433 and reflected by the second reflecting surface 434 are deemed to be emitted from the focal points (F21), travel as parallel light rays in the projecting direction (D11) toward and are reflected by the inclined reflective surface 442, and propagate forwardly and outwardly of the second light exit surface 441.

As a whole, the first light rays (11) sequentially enter the first light entry lens portion 42, travel forwardly toward the first light exit lens portion 41, and project forwardly and outwardly from the first light exit surface 411, and the second light rays (L12) sequentially enter the second light entry lens portion 43, travel downwardly through the first light exit lens portion 41 to the second light exit lens portion 44, are reflected by the inclined reflective surface 442, and project forwardly and outwardly from the second light exit surface 441. The first light entry lens portion 42 is configured such that the first light rays (L11) do not pass by the second light exit lens portion 44 and do not be emitted from the second light exit surface 441. The second light entry lens portion 43 is configured such that the second light rays (L12) do not be emitted from the first light exit surface.

Some features of the embodiment reside in the following. By virtue of the configuration of the optical lens 4, the first light rays (L11) and the second light rays (L12) emitted respectively by the first light emitting module 31 and the second light emitting module 32 in different directions are reflected and project forwardly from the first light exit surface 411 and the second light exit surface 441 in the front-rear direction to be seen by a road user. As such, the first light emitting module 31 and the second light emitting module 32 may respectively provide lights rays having different vehicle lighting functions. For example, the first light rays (L11) may serve as light rays of a headlamp, and the second light rays (L12) may serve as light rays of a daytime running lamp or turn signals. In this way, the embodiment of the present disclosure provides two different vehicle lighting functions.

In addition, since the vehicle light device of the present disclosure includes the plurality of first light emitting modules 31, the plurality of first light entry lens portions 42, and the plurality of first light exit lens portions 41, a portion of the first light rays (11) may be employed to serve as high beams, and another portion of the first light rays (11) may be employed to serve as low beams. Similarly, since the vehicle light device of the present disclosure includes the plurality of second light emitting modules 32, the plurality of second light entry lens portions 43, and the plurality of second light exit lens portions 44, a portion of the second light rays (L12) may be employed to serve as light rays of a daytime running lamp, and another portion of the second light rays (L12) may be employed to serve as turn signals. In this way, the embodiment provides various vehicle lighting functions. Furthermore, the advantage of each inclined reflective surface 442 including a plurality of reflective surface portions 443 resides in that the second light rays (L12) may be distributed evenly by the reflective surface portions 443 so that the second light rays (L12) exited from the second light exit surface 441 comply with regulations.

In summary, the advantages of the vehicle light device according to the present disclosure reside in the following. The first light rays (11) and the second light rays (L12) emitted respectively by the first light emitting module 31 and the second light emitting module 32 exit respectively and forwardly from the first light exit surface 411 and the second light exit surface 441 in the front-rear direction and may be seen by a road user. Thus, the vehicle light device provides lights rays having various vehicle lighting functions such as a headlamp with high beams and low beams, a daytime running lamp, and turn signals.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A vehicle light device comprising:

an optical lens that includes a first light exit lens portion having a first light exit surface that is disposed at a front portion thereof and that faces forwardly in a front-rear direction, a first light entry lens portion connected to said first light exit lens portion and disposed behind said first light exit lens portion in the front-rear direction, a second light entry lens portion connected to one of an upper portion and a lower portion of said first light exit lens portion that are opposite in an up-down direction perpendicular to the front-rear direction, and a second light exit lens portion connected to another one of said upper portion and said lower portion of said first light exit lens portion, and having a second light exit surface that is connected to said another one of said upper portion and said lower portion of said first light exit lens portion and that faces forwardly in the front-rear direction, and an inclined reflective surface that extends inclinedly and rearwardly in the front-rear direction from one end of said second light exit surface opposite to said first light exit surface; and a light-emitting unit that includes a first light emitting module configured to emit a plurality of first light rays toward said first light entry lens portion, the first light rays traveling toward said first light exit lens portion upon entering said first light entry lens portion, and exiting outwardly of said first light exit surface, and a second light emitting module configured to emit a plurality of second light rays toward said second light entry lens portion, upon entering said second light entry lens portion, said second light rays passing by said first light exit lens portion, traveling toward said second light exit lens portion, and then reflected by said inclined reflective surface to exit outwardly of said second light exit surface, and wherein said first light entry lens portion is configured such that the first light rays do not pass by said second light exit lens portion and do are not emitted from said second light exit surface, and said second light entry lens portion is configured such that the second light rays do are not emitted from said first light exit surface.

2. The vehicle light device as claimed in claim 1, wherein said inclined reflective surface includes a plurality of reflective surface portions divided into a plurality of groups that are arranged in a left-right direction transverse to the front-rear direction and the up-down direction, said reflective surface portions of each of said groups being arranged in the up-down direction.

3. The vehicle light device as claimed in claim 2, wherein said second light exit surface extends vertically in the up-down direction, faces forwardly in the front-rear direction, and cooperates with said inclined reflective surface to define an angle ranging from 40 degrees to 50 degrees therebetween.

4. The vehicle light device as claimed in claim 1, wherein:

said first light exit surface protrudes forwardly in the front-rear direction and has a first focal point; and said first light entry lens portion is formed with, at a rear part thereof, a first light-collecting space extending substantially in the front-rear direction and allowing the first light rays to pass therethrough, and has a first end section formed on said rear part of said first light entry lens portion, a first main light incident surface disposed in front of said first light-collecting space in the front-rear direction, a first bordering light incident surface connected to and bordering said first main light incident surface, and cooperating with said first main light incident surface and said first end section to define said first light-collecting space thereamong, and a first reflecting surface extending forwardly from said first end section in the front-rear direction, connected to said first light exit lens portion, and embracing said first light-collecting space.

5. The vehicle light device as claimed in claim 4, wherein said first light entry lens portion is configured such that extension lines of the first light rays incident on said first main light incident surface extend through the first focal point, and such that the extension lines of the first light rays incident on said first bordering light incident surface extend through a plurality of first imaginary focal points, each of the first imaginary focal points and the first focal point being two focal points of a hyperbola.

6. The vehicle light device as claimed in claim 4, wherein said first reflecting surface includes two first sections spaced apart from each other in the up-down direction, and extending forwardly from said first end section in the front-rear direction, two second sections spaced apart from each other in a left-right direction transverse to the front-rear direction and the up-down direction, and extending forwardly from said first end section in the front-rear direction, and a plurality of third sections extending forwardly from said first end section in the front-rear direction, each of said third sections being disposed between and being discontinuous with an adjacent one of said first sections and an adjacent one of said second sections.

7. The vehicle light device as claimed in claim 1, wherein said second light entry lens portion is formed, at an uppermost part thereof, with a second light-collecting space extending substantially in the up-down direction and allowing the second light rays to pass therethrough, and has a second end section formed on said uppermost part of said second light entry lens portion, a second main light incident surface disposed under said second light-collecting space in the up-down direction, a second bordering light incident surface connected to and bordering said second main light incident surface, and cooperating with said second main light incident surface and said second end section to define said second light-collecting space thereamong, and a second reflecting surface extending downwardly from said second end section in the up-down direction, connected to said first light exit lens portion, and embracing said second light-collecting space.

8. The vehicle light device as claimed in claim 7, wherein said second light entry lens portion is configured such that the second light rays incident on said second main light incident surface travel toward said inclined reflective surface in a projecting direction transverse to the front-rear direction, and such that extension lines of the second light rays incident on said second bordering light incident surface and reflected by said second reflecting surface travel toward said inclined reflective surface in the projecting direction.

9. The vehicle light device as claimed in claim 7, wherein said second main light incident surface has a second focal point, said second light emitting module is disposed at the second focal point, and said second reflecting surface includes two second reflecting portions symmetric with respect to an optical axis, and each of said second reflecting portions is a portion of a paraboloid that is symmetric with respect to an axis deviated from and parallel to the optical axis and that has a focal point, and said second light entry lens portion is configured such that extension lines of the second light rays incident on said second bordering light incident surface extend through the focal points.

* * * * *